(12) United States Patent
Driscoll et al.

(10) Patent No.: US 7,668,084 B2
(45) Date of Patent: Feb. 23, 2010

(54) SYSTEMS AND METHODS FOR FAULT-TOLERANT HIGH INTEGRITY DATA PROPAGATION USING A HALF-DUPLEX BRAIDED RING NETWORK

(75) Inventors: Kevin R. Driscoll, Maple Grove, MN (US); Brendan Hall, Eden Prairie, MN (US); Michael Paulitsch, Columbia Heights, MN (US)

(73) Assignee: Honeywell International Inc., Morristown, NJ (US)

(*) Notice: Subject to any disclaimer, the term of this patent is extended or adjusted under 35 U.S.C. 154(b) by 489 days.

(21) Appl. No.: 11/537,305

(22) Filed: Sep. 29, 2006

(65) Prior Publication Data

US 2008/0080551 A1 Apr. 3, 2008

(51) Int. Cl.
*H04L 12/26* (2006.01)
(52) U.S. Cl. .................. 370/227; 370/217; 370/223
(58) Field of Classification Search .............. 370/223
See application file for complete search history.

(56) References Cited

U.S. PATENT DOCUMENTS

| | | | |
|---|---|---|---|
| 4,417,334 A | 11/1983 | Gunderson et al. |
| 4,428,046 A | 1/1984 | Chari et al. |
| 4,630,254 A | 12/1986 | Tseng |
| 4,631,718 A | 12/1986 | Miyao |
| 4,654,480 A | 3/1987 | Weiss |
| 4,733,391 A | 3/1988 | Godbold et al. |
| 4,740,958 A | 4/1988 | Duxbury et al. |

(Continued)

FOREIGN PATENT DOCUMENTS

AT 407582 B 4/2001

(Continued)

OTHER PUBLICATIONS

Alberto Leon-Garcia, Communication Networks: Fundamental Concepts and Key Architectures, 2004, McGraw-Hill, 2nd Edition, ISBN 0-07-246352-X, pp. 226-227, 444-445.*

(Continued)

*Primary Examiner*—Chi H Pham
*Assistant Examiner*—David Andreasen
(74) *Attorney, Agent, or Firm*—Fogg & Powers LLC (57) ABSTRACT

In one embodiment, a network comprises a plurality of nodes that are communicatively coupled to one another using bidirectional, half-duplex links. The network has a logical first channel over which data is propagated along the network in a first direction and a logical second channel over which data is propagated along the network in a second direction. For a given period of time, at least one of the plurality of nodes is scheduled to be a transmitting node that transmits data on both the first channel and the second channel. A first subset of the nodes not scheduled to transmit during the period are scheduled to relay data received from the first channel along the first channel. A second subset of the nodes not scheduled to transmit during the period are scheduled to relay data received from the second channel along the second channel. At least one of the nodes not scheduled to transmit during the period does not relay any data on at least one of that node's outbound links for at least one of the first channel and the second channel.

19 Claims, 3 Drawing Sheets

U.S. PATENT DOCUMENTS

| | | | |
|---|---|---|---|
| 4,856,023 A | 8/1989 | Singh |
| 4,866,606 A | 9/1989 | Kopetz |
| 4,905,230 A | 2/1990 | Madge et al. |
| 5,132,962 A | 7/1992 | Hobgood et al. |
| 5,161,153 A | 11/1992 | Westmore |
| 5,235,595 A | 8/1993 | O'Dowd |
| 5,257,266 A | 10/1993 | Maki |
| 5,307,409 A | 4/1994 | Driscoll |
| 5,341,232 A | 8/1994 | Popp |
| 5,383,191 A | 1/1995 | Hobgood et al. |
| 5,386,424 A | 1/1995 | Driscoll et al. |
| 5,394,401 A | 2/1995 | Patrick et al. |
| 5,463,634 A | 10/1995 | Smith et al. |
| 5,557,778 A | 9/1996 | Vaillancourt |
| 5,687,356 A | 11/1997 | Basso et al. |
| 5,715,391 A | 2/1998 | Jackson et al. |
| 5,742,646 A | 4/1998 | Woolley et al. |
| 5,896,508 A | 4/1999 | Lee |
| 5,903,565 A | 5/1999 | Neuhaus et al. |
| 5,920,267 A | 7/1999 | Tattersall et al. |
| 5,937,414 A | 8/1999 | Souder et al. |
| 5,940,367 A | 8/1999 | Antonov |
| 6,052,753 A | 4/2000 | Doerenberg et al. |
| 6,172,984 B1 | 1/2001 | Beyda et al. |
| 6,175,553 B1 | 1/2001 | Luk et al. |
| 6,219,528 B1 | 4/2001 | Wright et al. |
| 6,226,676 B1 | 5/2001 | Crump et al. |
| 6,374,078 B1 | 4/2002 | Williams et al. |
| 6,414,953 B1 | 7/2002 | Lamarche et al. |
| 6,513,092 B1 | 1/2003 | Gorshe |
| 6,594,802 B1 | 7/2003 | Ricchetti et al. |
| 6,618,359 B1 | 9/2003 | Chen et al. |
| 6,707,913 B1 | 3/2004 | Harrison et al. |
| 6,741,559 B1 | 5/2004 | Smeulderse et al. |
| 6,760,768 B2 | 7/2004 | Holden et al. |
| 6,765,924 B1 | 7/2004 | Wu et al. |
| 6,842,617 B2 | 1/2005 | Williams et al. |
| 6,925,497 B1 | 8/2005 | Vetrivelkumaran et al. |
| 6,956,461 B2 | 10/2005 | Yoon et al. |
| 7,035,539 B2 | 4/2006 | Gumaste |
| 7,050,395 B1 | 5/2006 | Chow et al. |
| 7,085,560 B2 | 8/2006 | Petermann |
| 7,088,921 B1 | 8/2006 | Wood |
| 7,269,177 B2 | 9/2007 | Baker |
| 7,349,414 B2 | 3/2008 | Sandstrom |
| 7,372,859 B2 | 5/2008 | Hall et al. |
| 7,457,303 B2 | 11/2008 | Blumrich et al. |
| 7,502,334 B2 | 3/2009 | Hall et al. |
| 2002/0027877 A1 | 3/2002 | Son et al. |
| 2002/0087763 A1 | 7/2002 | Wendorff |
| 2002/0118636 A1 | 8/2002 | Phelps et al. |
| 2003/0002435 A1 | 1/2003 | Miller |
| 2003/0067867 A1 | 4/2003 | Weis |
| 2003/0128984 A1 | 7/2003 | Oberg et al. |
| 2004/0073698 A1 | 4/2004 | Harter et al. |
| 2004/0223515 A1 | 11/2004 | Rygielski et al. |
| 2004/0258097 A1 | 12/2004 | Arnold et al. |
| 2005/0002332 A1 | 1/2005 | Oh |
| 2005/0132105 A1 | 6/2005 | Hall et al. |
| 2005/0135278 A1 | 6/2005 | Hall et al. |
| 2005/0152377 A1 | 7/2005 | Hall et al. |
| 2005/0152379 A1* | 7/2005 | Hall et al. ............ 370/400 |
| 2005/0169296 A1 | 8/2005 | Katar et al. |
| 2005/0198280 A1 | 9/2005 | Hall et al. |
| 2006/0077981 A1 | 4/2006 | Rogers |
| 2006/0203851 A1 | 9/2006 | Eidson |
| 2008/0144526 A1 | 6/2008 | Hall et al. |
| 2008/0144668 A1 | 6/2008 | Hall et al. |
| 2009/0086653 A1 | 4/2009 | Driscoll et al. |

FOREIGN PATENT DOCUMENTS

| | | |
|---|---|---|
| DE | 3238692 | 4/1984 |
| DE | 19633744 | 2/1998 |
| DE | 20220280 | 11/2003 |
| EP | 0405706 | 2/1990 |
| EP | 1280024 | 1/2003 |
| EP | 1280312 | 1/2003 |
| EP | 1365543 | 11/2003 |
| EP | 1398710 | 3/2004 |
| EP | 1469627 | 10/2004 |
| EP | 1672847 | 6/2006 |
| GB | 2028062 | 2/1980 |
| GB | 1581803 | 12/1980 |
| GB | 2175775 | 12/1986 |
| WO | 0064122 | 10/2000 |
| WO | 0213393 | 2/2002 |
| WO | 0235761 | 5/2002 |
| WO | 03030437 | 4/2003 |
| WO | 2006063237 | 6/2006 |

OTHER PUBLICATIONS

Al-Rousan et al., "The Two-Processor Reliability of Hierarchical Larg-Scale Ring-Based Networks", "Proceedings of the 29th Hawaii International Conference on System Sciences", 1996, pp. 63-71.

"Backplane Data Bus ARINC Specification 659", December 1993, pp. 1-132, Publisher: ARINC.

Avizienis, "A Fault Tolerance Infrastructure for Dependable Computing With High-Performance COTS Componenets", "Conference Proceedings on Dependable Systems and Networks", Jun. 2000, pp. 492-500, Publisher: IEEE, Published in: New York, NY.

Bauer et al., "Assumption Coverage Under Different Failure Modes in the Time-Triggered Architecture", "8th IEEE International Conference on Emerging Technologies and Factory Automation", Oct. 2001, pp. 333-341, Publisher: IEEE.

Bauer et al., "Transparent Redundancy in the Time-Triggered Architecture", "Proceedings of the Conference on Dependable Systems and Networks", 2000, pp. 5-13, Publisher: IEEE.

Bauer et al., "The Central Guardian Approach to Enforce Fault Isolation in a Time-Triggered System", "Proceedings of Symposium on Autonomous Decentralized Systems", Apr. 2003, pp. 37-44, Publisher: IEEE.

Bosch, "Can Specification Version 2.0", "SAE Handbook—Parts and Components", 1998, pp. 1-72, vol. 2, Publisher: Society of Automotive Engineers.

D'Luna, "A Single-Chip Universal Cable Set-Top Box/Modern Transceiver", "Journal of Sold-State Circuits", Nov. 1998, pp. 1647-1660, vol. 34, No. 11, Publisher: IEEE.

Driscoll et al., "The Real Byzantine Generals ", "Proceedings of Digital Avionics System Conference", Oct. 2004, pp. 6.D.4-1-6.D.4-11, Publisher: IEEE.

Brinkmeyer, "Flexray International Workshop Slides", "www.flexray-group.com", Apr. 2002, pp. 1-356, Publisher: Flexray.

"Flexray Communication System: Protocol Specification Version 2.1 Revision A", "www.flexray-group.com", Mar. 2006, pp. 1-8, Publisher: Flexray Consortium.

"Preliminary Node-Local Bus Guardian Specification Version 2.0.9", Dec. 2005, pp. 1-75, Publisher: Flexray Consortium.

"Preliminary Central Bus Guardian Specification Version 2.0.9", Dec. 2005, pp. 1-38, Publisher: Flexray Consortium.

Grnarov et al., "A Highly Reliable Distributed Loop Network Architecture", "Proceedings of Fault-Tolerant Computing Symposium", Jun. 1980, pp. 319-324, Publisher: IEEE.

Gruenbacher, "Fault Injection for TTA", 1999, Publisher: Information Society Technologies.

Hall et al., "Ringing Out Fault Tolerance a New Ring Network for Superior Low-Dost Dependabilitiy", "International Conference on Dependable Systems and Networks (DSN'05)", 2005, pp. 298-307.

Hammett et al., "Achieving 10-9 Dependability With Drive-By-Wire Systems", "SAE World Congress", 2003, pp. 534-547, vol. 112, No. 7, Publisher: Society of Automotive Engineers.

Hopper et al., "Design and Use of an Integrated Cambridge Ring", "Journal on Selected Areas in Communications", Nov. 2003, pp. 775-784, vol. 1, No. 5, Publisher: IEEE.

Hoyme et al., "SAFEbus", "Proceedings of the Digital Avionics Systems Conference", Oct. 1992, pp. 68-73, Publisher: IEEE.

Hoyme et al., "SAFEbus ", "IEEE Aerospce and Electronics Systems Magazine", Mar. 1993, pp. 34-39, vol. 8, No. 3, Publisher: IEEE.

Huber et al., "Silk: An Implementation of a Buffer Insertion Ring", "Journal on Selected Areas in Communications", Nov. 1983, pp. 766-774, vol. 1, No. 5, Publisher: IEEE.

Hwang et al., "Survival Reliability of Some Double-Loop Networks and Chordal Rings", "Transactions on Computers", 1995, pp. 1468-1471, vol. 44, No. 12, Publisher: IEEE.

"Internet Content Adaptation", "Network Appliance", Jul. 2001, pp. 1-13.

IEEE Computer Society, "1149.6 IEEE Standard for Boundary-Scan Testing of Advanced Digital Networks", Apr. 17, 2003, pp. 1-139, Publisher: IEEE, Published in: New York, NY.

Irvin, "Embedding a Secondary Communication Channel Transparently Within a Cyclic Redundancy Check (CRC)", "Journal of Research and Developement", Nov. 2001, pp. 789-796, vol. 45, No. 6, Publisher: IBM.

Johansson et al., "On Communication Requirements for Control-By-Wire Applications", "Proceedings of System Safety Conference", Aug. 2003, pp. 1123-1132.

Kanoun et al., "Dependability Evaluation of Bus and Ring Communication Topologies for the Delta-4 Distr Fault-Tolerant Architecture", "Proceedings of the Symposium on Reliable Distributed Systems", 1991, pp. 130-141, Publisher: IEEE.

Kieckhafer et al., "The MAFT Architecture for Distributed Fault Tolerance", "Transactions on Computers", 1988, pp. 398-405, vol. 37, No. 4, Publisher: IEEE.

Kopetz et al., "TTP—A Protocol for Fault-Tolerant Real-Time Systems", "Computer", Jan. 1194, pp. 14-23, vol. 27, No. 1, Publisher: IEEE Computer Society, Published in: Long Beach, CA.

Liu et al., "The Distributed Double-Loop Computer Network (DDLCN)", "ACM '80 Proceedings of the ACM 1980 Annual Conference", 1980, pp. 164-178, Publisher: ACM.

Lonn, "Initialsynchronization of TDMA Communication in Distributed Real-Time Systems", "Conference on Distributed Computing Systems", 1999, pp. 370-379, Publisher: IEEE.

Nayak et al., "Ring Reconfiguration in Presence of Close Fault Cuts", "Proceedings of Hawaii International Conference on System Science", 1996, pp. 422-428, Publisher: IEEE.

Paulitsch et al., "Cverage and the Use of Cyclic Redundancy Codes in Ultra-Dependable Systems", "2005 International Conference on Dependable Systems and Networks (DSN'05)", 2005, pp. 346-355.

Poledna et al., "Replica Determinism and Flexible Scheduling in Hard Real-Time Dependable Systms", "IEEE Transactions on Computers", Feb. 2000, pp. 100-111, vol. 49, No. 2, Publisher: IEEE.

Poledna, "Replica Determinism in Distributed Real-Time Systems: A Brief Survey", "Real-Time Systems", 1994, pp. 289-316, vol. 6.

"Software Considerations in Airborne Systems and Equipment Certification", "http://www.rtca.org", Dec. 1992, pp. 1-112, Publisher: RTCA.DO-178b.

Rushby, "Bus Architectures for Safety-Critical Embedded Systems, Embedded Software", "Proceedings of 1st International Workshop on Embedded Software, Notes in Computer Science", Oct. 2001, pp. 306-323, vol. 2211, Publisher: Springer-Verlag, Published in: Germany.

Saltzer et al., "Why a Ring", "Proceedings of Symposium on Data Communications", 1981, pp. 211-217, Publisher: IEEE.

Sivencrona et al., "Protocol Membership Agreement in Distributed Communicaiton System—A Question of Brittleness", "SAE World Congress, Paper No. 2003-01-0108", 2003, pp. 1-6, Publisher: Society of Automotive Engineers Inc.

Steiner et al., "The Startup Problem in Fault-Tolerant Time-Triggered Communication", "International Conference on Dependable Systems and Networks (DSN'06)", 2006, pp. 35-44.

Steiner et al., "The Transition From Asynchronous to Synchronous System Operation: An Approach From Distributed Fault-Tolerant Systems", "Proceedings of Conference on Distributed Computing Systems", Jul. 2002, pp. 329-336, Publisher: IEEE.

Sundaram et al., "Controller Integrity in Automotive Failsafe System Architectures", "2006 SAE World Congress", 2006, pp. 1-10, Publisher: SAE International.

Tomlinson et al., "Extensible Proxy Services Framework", Jul. 2000, pp. 1-13, Publisher: Internet Society.

"Time-Triggered Protocol TTP/C", 2004, Publisher: TTTECH Computertechnik GmbH, Published in: Austria.

Wensley et al., "The Design, Analysis, and Verification of the Sift Fault Tolerant System", "Proceedings of Conference on Software Engineering", 1976, pp. 458-469, Publisher: IEEE Computer Society Press.

Yeh, "Design Condiserations in Boeing 777 Fly-By-Wire Computers", "High-Asssurance Systems Engineering Symposium", Nov. 1998, pp. 64-72, Publisher: IEEE.

Yeh, "Triple-Triple Redundant 777 Primary Flight Computer", "Proceedings of the Aerospace Applications Conference", 1996, pp. 293-307, vol. 1, Publisher: IEEE, Published in: New York, NY.

European Patent Office, "European Search Report", Dec. 17, 2008, Published in: EP.

* cited by examiner

Fig. 1

| Timeslot / Node | 1 | 2 | 3 | 4 | 5 | 6 | 7 | 8 |
|---|---|---|---|---|---|---|---|---|
| A | Transmit | Guardian for node B & Propagate Ch. 1 | Propagate Ch. 1 | nadir action | nadir action | Propagate Ch. 0 | Propagate Ch. 0 | Guardian for node H & Propagate Ch. 0 |
| B | Guardian for node A & Propagate Ch. 0 | Transmit | Guardian for node C & Propagate Ch. 1 | Propagate Ch. 1 | nadir action | nadir action | Propagate Ch. 0 | Propagate Ch. 0 |
| C | Propagate Ch. 0 | Guardian for node B & Propagate Ch. 0 | Transmit | Guardian for node D & Propagate Ch. 1 | Propagate Ch. 1 | nadir action | nadir action | Propagate Ch. 0 |
| D | Propagate Ch. 0 | Propagate Ch. 0 | Guardian for node C & Propagate Ch. 0 | Transmit | Guardian for node E & Propagate Ch. 1 | Propagate Ch. 1 | nadir action | nadir action |
| E | nadir action | Propagate Ch. 0 | Propagate Ch. 0 | Guardian for node D & Propagate Ch. 0 | Transmit | Guardian for node F & Propagate Ch. 1 | Propagate Ch. 1 | nadir action |
| F | nadir action | nadir action | Propagate Ch. 0 | Propagate Ch. 0 | Guardian for node E & Propagate Ch. 0 | Transmit | Guardian for node G & Propagate Ch. 1 | Propagate Ch. 1 |
| G | Propagate Ch. 1 | nadir action | nadir action | Propagate Ch. 0 | Propagate Ch. 0 | Guardian for node F & Propagate Ch. 0 | Transmit | Guardian for node H & Propagate Ch. 1 |
| H | Guardian for node A & Propagate Ch. 1 | Propagate Ch. 1 | nadir action | nadir action | Propagate Ch. 0 | Propagate Ch. 0 | Guardian for node G & Propagate Ch. 0 | Transmit |

SYSTEMS AND METHODS FOR FAULT-TOLERANT HIGH INTEGRITY DATA PROPAGATION USING A HALF-DUPLEX BRAIDED RING NETWORK

CROSS REFERENCE TO RELATED APPLICATIONS

This application is related to co-pending U.S. patent application Ser. No. 10/993,936, titled "SYNCHRONOUS MODE BROTHER'S KEEPER BUS GUARDIAN FOR A TDMA BASED NETWORK," filed on Nov. 19, 2004, which is hereby incorporated by reference in its entirety and referred to herein as the "'936 application.

This application is related to co-pending U.S. patent application Ser. No. 10/993,931 filed Nov. 19, 2004 entitled "UNSYNCHRONOUS MODE BROTHER'S KEEPER BUS GUARDIAN FOR A RING NETWORKS", which is hereby incorporated by reference in its entirety and referred to herein as the "'931 application.

This application is related to co-pending U.S. patent application Ser. No. 11/010,249, filed Dec. 10, 2004, entitled "SELF-CHECKING PAIR ON A BRAIDED RING NETWORK", hereby incorporated herein by reference, and referred to herein as the "'249 application".

BACKGROUND

Distributed, fault-tolerant communication systems are used, for example, in applications where a failure could possibly result in injury or death to one or more persons. Such applications are referred to here as "safety-critical applications." One example of a safety-critical application is in a system that is used to monitor and manage sensors and actuators included in an airplane or other aerospace vehicle Often safety critical applications are implemented using a time-triggered, table driven communications architecture, for example, SAFEbus, FlexRay or Time-Triggered Protocol (TTP). To provide tolerance to physical faults, robust communications topologies that allow for point-to-point fault isolation (such as star, mesh, ring, and braided ring configurations) are often deployed. However, such topologies may introduce undesirable overhead for in the form of additional components (for example, in star configurations) or extra wiring complexity (for example, in mesh or braided ring configurations).

SUMMARY

In one embodiment, a network comprises a plurality of nodes that are communicatively coupled to one another using bi-directional, half-duplex links. The network has a logical first channel over which data is propagated along the network in a first direction and a logical second channel over which data is propagated along the network in a second direction. For a given period of time, at least one of the plurality of nodes (for example, a single transmitting node or two neighboring nodes acting as a self-checking pair) is scheduled to be a transmitting node that transmits data on both the first channel and the second channel. A first subset of the nodes not scheduled to transmit during the period are scheduled to relay data received from the first channel along the first channel. A second subset of the nodes not scheduled to transmit during the period are scheduled to relay data received from the second channel along the second channel. At least one of the nodes not scheduled to transmit during the period does not relay any data on at least one of that node's outbound links for at least one of the first channel and the second channel.

In one implementation of such an embodiment, if any of the data transmitted by the transmitting node during the period is not validly received from the first channel by any of the first subset of nodes, the data that was not validly received from the first channel by any of the first subset of nodes is forwarded to those nodes along the second channel for receipt thereby.

Another embodiment is a method of propagating data in a network. The network comprises a plurality of nodes that are communicatively coupled to one another using bi-directional, half-duplex links. The network has a logical first channel over which data is propagated along the network in a first direction and a logical second channel over which data is propagated along the network in a second direction. The method comprises, for a given period of time, transmitting data on the first channel and on the second channel from at least one of the plurality of nodes that is scheduled to be a transmitting node. The method further comprises, for the given period of time, relaying along the first channel data validly received from the first channel by a first subset of the nodes that are not scheduled to transmit during the period and relaying along the second channel data validly received from the second channel by a second subset of the nodes that are not scheduled to transmit during the period. At least one of the nodes not scheduled to transmit during the period does not relay any data on at least one of that node's outbound links to at least one of the first channel and the second channel.

In one implementation of such an embodiment, the method further comprises, if any of the data transmitted by the transmitting node during the period is not validly received from the first channel by any of the first subset of nodes, forwarding along the second channel the data transmitted by the transmitting node during the period that was not validly received from first channel by any of the first subset of nodes for receipt thereby and, at those nodes in the first subset of nodes that did not validly receive from the first channel all the data transmitted by the transmitting node during the period, combining data was validly received from the first channel at those nodes with data that was validly received from the second channel at those nodes in order to reassemble all the data transmitted by the transmitting node during the period.

In another embodiment, a program product comprises program instructions embodied on a processor-readable medium for execution by a programmable processor included in a node that is used in a network. The network comprises a plurality of nodes that are communicatively coupled to one another using bidirectional, half-duplex links. The network has a logical first channel over which data is propagated along the network in a first direction and a logical second channel over which data is propagated along the network in a second direction. The program instructions are operable to cause the programmable processor to, when the node is scheduled to be a transmitting node for a given period of time, transmit data on the first channel and on the second channel. The program instructions are further operable to cause the programmable processor to, while the node is not scheduled to be the transmitting node for the period, relay, along the first channel, data validly received from the first channel when the node is scheduled to do so; and not relay any data on at least one of the node's outbound links for the first channel when scheduled to do so.

In one implementation of such an embodiment, the program instructions are further operable to cause the programmable processor to do the following when scheduled to do so while the node is not scheduled to be the transmitting node for the period: receive data from both the first channel and the second channel, and, if the nadir node determines that any of the first subset of nodes did not validly receive from the first channel all of the data transmitted by the transmitting node during the period and the nadir node received from the second channel the data that was not validly received from the first channel by any of the first subset of nodes, forward that data along the second channel.

The details of various embodiments of the claimed invention are set forth in the accompanying drawings and the description below. Other features and advantages will become apparent from the description, the drawings, and the claims.

DETAILED DESCRIPTION

In the following description, various embodiments of the present invention may be described in terms of various computer architecture elements and processing steps. It should be appreciated that such elements may be realized by any number of hardware or structural components configured to perform specified operations. Further, it should be noted that although various components may be coupled or connected to other components within exemplary system architectures, such connections and couplings can be realized by direct connection between components, or by connection through other components and devices located therebetween. The following detailed description is, therefore, not to be taken in a limiting sense.

Instructions for carrying out the various process tasks, calculations, and generation of signals and other data used in the operation of the systems and methods of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Embodiments of the present invention increase network dependability through the reduction of connectors by implementing half-duplex communication links between the nodes of a braided-ring network instead of separate communication links between nodes for each direction. Fault tolerant communication of messages simultaneously traveling clockwise and counter-clockwise around the half-duplex braided-ring network is achieved by embodiments of the present invention through the implementation of "nadir nodes" described in detail below. Further, embodiments of the present invention provide a high integrity data propagation mechanism that enables simultaneous data propagation on half-duplex links, in a manner that facilitates the immediate detection of a propagation fault and additional mechanisms to re-configure half-duplex communication paths to the supplement the erroneous data flow.

Figure 1:
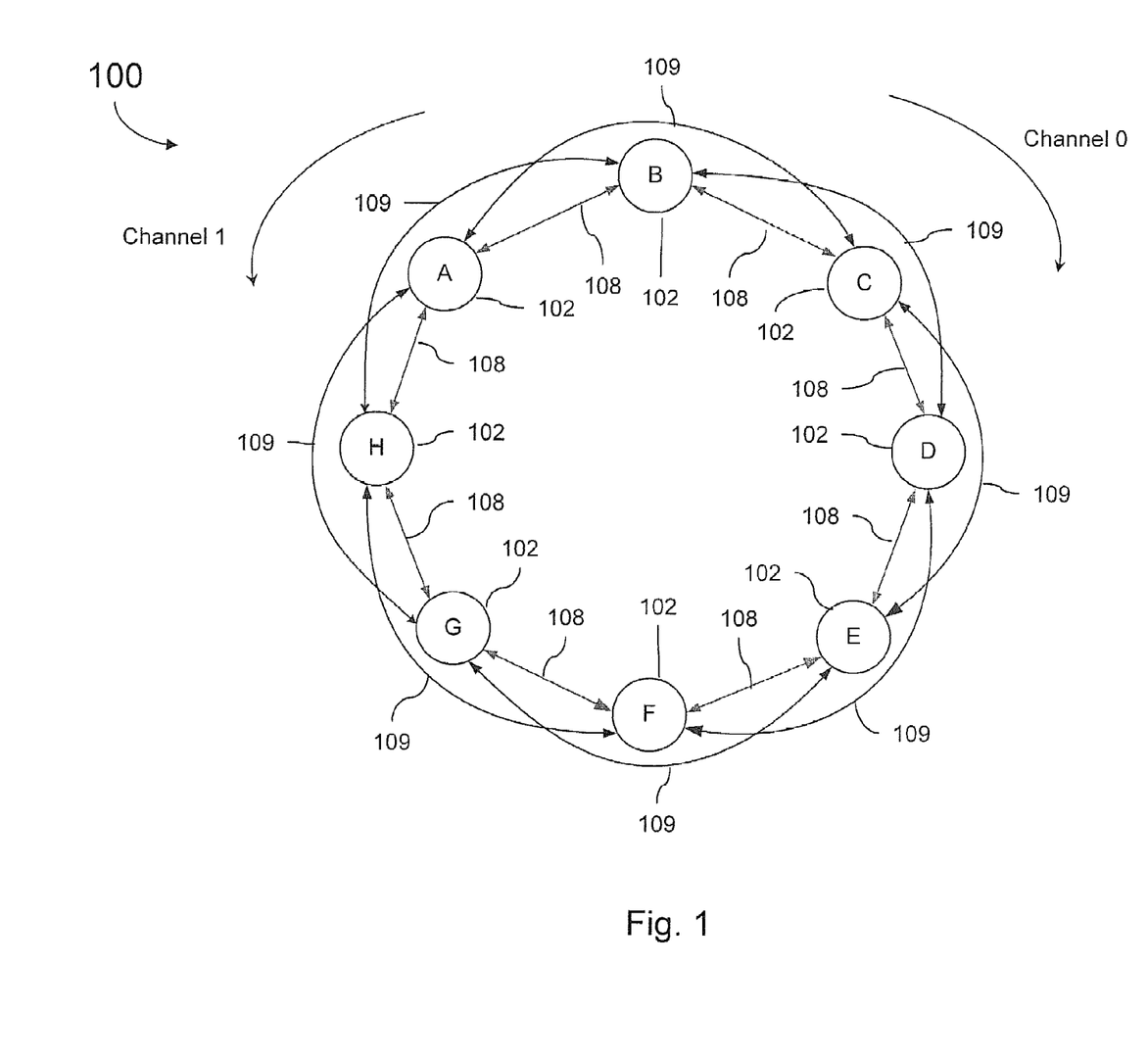
FIG. 1 is schematic depiction of a bi-directional half-duplex braided ring communication network of one embodiment of the present invention.

FIG. 1 is a block diagram of one embodiment of a bi-directional half-duplex braided ring communication network 100. Communication network 100 includes multiple nodes 102 that communicate data with each other over using multiple point-to-point, bidirectional serial links. In this embodiment, a logical first channel (labeled "Channel 0" in FIG. 1) that is defined as the path traveled by data propagating in the clockwise direction around network 100 and a logical second channel (labeled "Channel 1" in FIG. 1) is defined as the path traveled by data propagating in the counter-clockwise direction around network 100. Both the first channel and the second channel utilize the same set of bidirectional serial links to propagate data, although any one link can only be utilized to propagate data in a single direction at a time.

In the particular embodiment shown in FIG. 1, eight nodes 102 communicate with one another over the two communication channels. In other embodiments, a different number and/or type of nodes 102 and/or channels and/or a different network topology are used. Embodiments of network 100 are implemented using various media access schemes. For example, the embodiment shown in FIG. 1 is described here as being implemented using a time division multiple access (TDMA) media access. In other embodiments, other media access schemes, such as but not limited to, dynamic mini-slotting are used.

The eight nodes 102 shown in FIG. 1 are also individually labeled in FIG. 1 with the letters "A" through "H" and are referred to here individually as "node A," "node B," and so forth. As used herein, a "neighbor node" (or just "neighbor") is a node that is immediately next to a given node 102 in the network 100. Each node 102 has two "neighbor" nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node A are node B in the clockwise direction and node H in the counter-clockwise direction.

In addition, as used herein, a "neighbor's neighbor node" (or just "neighbor's neighbor") for a given node 102 is the neighbor node 102 of the neighbor node 102 of the given node 102. Each node 102 has two neighbor's neighbor nodes 102, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node A are node C in the clockwise direction and node G in the counter-clockwise direction.

As shown in FIG. 1, the first channel (that is, Channel 0) interconnects the nodes 102 by propagating data in the clockwise direction around network 100 and the second channel (that is, Channel 1) interconnects the nodes 102 by propagating data in the counter-clockwise direction around network 100. For a given direction in which data flows in a channel, the channel directly communicatively couples (that is, with only one hop) each node 102 to at least two other nodes 102 from which that node 102 receives data and to at least two other nodes 102 to which that node 102 transmits data.

Direct links 108 connect a given node 102 to that node's respective clockwise and counter-clockwise neighbor nodes. The links 109 that connect a given node 102 to that node's respective clockwise and counter-clockwise neighbor's neighbors are referred to here as "skip" links 109.

In the embodiment shown in FIG. 1, when a given node 102 "transmits" data (that is, when the given node 102 is the source of data communicated on the network 100) along a channel in a given direction, that node 102 transmits the data to the nodes 102 designated for that node 102 in both directions around the ring via its outbound direct link 108 and outbound skip link 109 for that channel and direction. In such an embodiment, when a node 102 "relays" data on a channel in a given direction for a given timeslot (or other period of time) and that node is not the transmitting node's outbound neighbor for that channel, that node 102 (in the absence of any faults) receives a bit of data on its inbound direct link 108 (which is coupled to the node's neighbor) and a corresponding bit on its inbound skip link 109 (which is coupled to the node's neighbor's neighbor) for that channel and direction. The node 102 then compares the bits received on its inbound direct link 108 and its inbound skip link 109. If the bits match, the node 102 forwards the received bit on its outbound link 108 and outbound skip link 108 for the channel. If the bits do not match, the node 102 truncates the current message by not forwarding any further bits for the current timeslot. When the node is the transmitting node's outbound neighbor for the relevant channel, the transmitting node will not be directly transmitting on that node's inbound skip link 109 (because that link 109 is not directly coupled to the transmitting node) and, as result, the node 102 relays any data it receives on its inbound direct link 108 along the channel on its outbound direct link 108 and outbound skip link 109 without performing the comparison noted above.

In one implementation of such an embodiment, each relay node also acts as a "brother's keeper guardian" for its inbound neighbor node on the relevant channel as is described in the '936 application and the '931 application. When a node is the transmitting node's outbound neighbor for the channel, the node verifies that any data received from the transmitting node complies with one or more policies (for example, content-based and/or temporal policies). If the data complies with all relevant policies, the node relays the data as described above. If not, the node either does not relay the data or appends to (or otherwise includes in) the transmitted data an indication that the data did not comply with the one or more policies. Different guardian actions can be taken for violating different policies. Also, if a faulty node that is not scheduled to transmit at a given point in time attempts to transmit on a particular channel, that node's outbound neighbor will detect that the data received on its inbound direct link 108 was transmitted by the faulty node (for example, because the same data will not have been received on the neighbor's inbound skip link 109) and, the neighbor, for example, will not relay any of the data transmitted by the faulty node.

In other embodiments, one or more pairs of nodes are scheduled to act as "self-checking pairs" in a similar manner as is described in the '249 application. In such an embodiment, each such self-checking pair operates in a replica-deterministic fashion at the application layer such that the output of both members of the self-checking pair is bit-for-bit identical. As result, the relay and/or guardian processing described above is modified in such an embodiment to the extent that each of the outbound neighbors of the self-checking pair will (in the absence of any faults) receive the same data transmitted by the self-checking pair on both its inbound direct link 108 and its inbound skip link 109. That is, for each such outbound neighbor of the self-checking pair, the neighbor's inbound direct link 108 couples that neighbor to one member of the self-checking pair and the neighbor's inbound skip link 109 is coupled to the other member of the self-checking pair. As described below, the neighbor of a self-checking pair propagates the data it receives from its inbound direct link 108 if corresponding matching data is received from that node's inbound skip link 109.

As shown in FIG. 1, a bi-directional direct link 108 is connected from each node 102 to that node's clockwise neighbor node 102, and a bi-directional direct link 108 is connected from each node 102 to that node's counter-clockwise neighbor node 102. A bi-directional skip link 109 is also connected from each node 102 to that node's clockwise neighbor's neighbor node 102, and a bi-directional skip link 109 is also connected from each node 102 to that node's counter-clockwise neighbor's neighbor node 102. For example, a bi-directional direct link 108 is connected between node A and node H and a skip link 109 is connected between node A and node G. As previously mentioned, data propagating through network 100 in the clockwise direction on direct and skip links make up channel 0 while data propagating through network 100 in the counter-clockwise direction on direct and skip links make up channel 1. Data is propagated by each node relaying data messages from upstream nodes of a channel to downstream nodes of the channel. For example, node A is downstream to node B on channel 1 and node A is downstream to node H on channel 0. Meanwhile, node A is an upstream node to node B on channel 0 and an upstream node to node H on channel 1.

Because each direct link 108 and skip link 109 operates in a half-duplex mode, each link is capable of propagating data in only one direction at any one time. For example, while node A is sending data along channel 0 in the clockwise direction to node B via direct link 108, node B cannot simultaneously send data to node A along channel 1 in the counter-clockwise direction via the same direct link 108. Similarly, while node A is sending data along channel 0 in the clockwise direction to node C via skip link 109, node C cannot simultaneously send data to node A along channel 1 in the counter-clockwise direction via the same skip link 109.

In the embodiments described here, propagation of data through the first and second channel is controlled in accordance with a network communication schedule. In one embodiment, the network communication schedule is stored in the form of a table such as network communication schedule 200 shown in FIG. 2. The network communication schedule is used to determine how each of nodes 102 behaves during each portion of a given schedule period or round. For example, during the given schedule period represented in FIG. 2, each of nodes A-H are assigned a respective time slot in which to transmit (either alone or as a part of a self-checking pair). For the schedule shown in FIG. 2, only node A is permitted to transmit during timeslot 1, only node B is permitted to transmit during timeslot 2, and so forth. Other nodes are also assigned other responsibilities based on network communication schedule 200. For example, during timeslot 1, when node A is permitted to transmit, nodes B and H are assigned as guardians (discussed below) and nodes E and F are assigned nadir action functions (discussed below).

Figure 2:
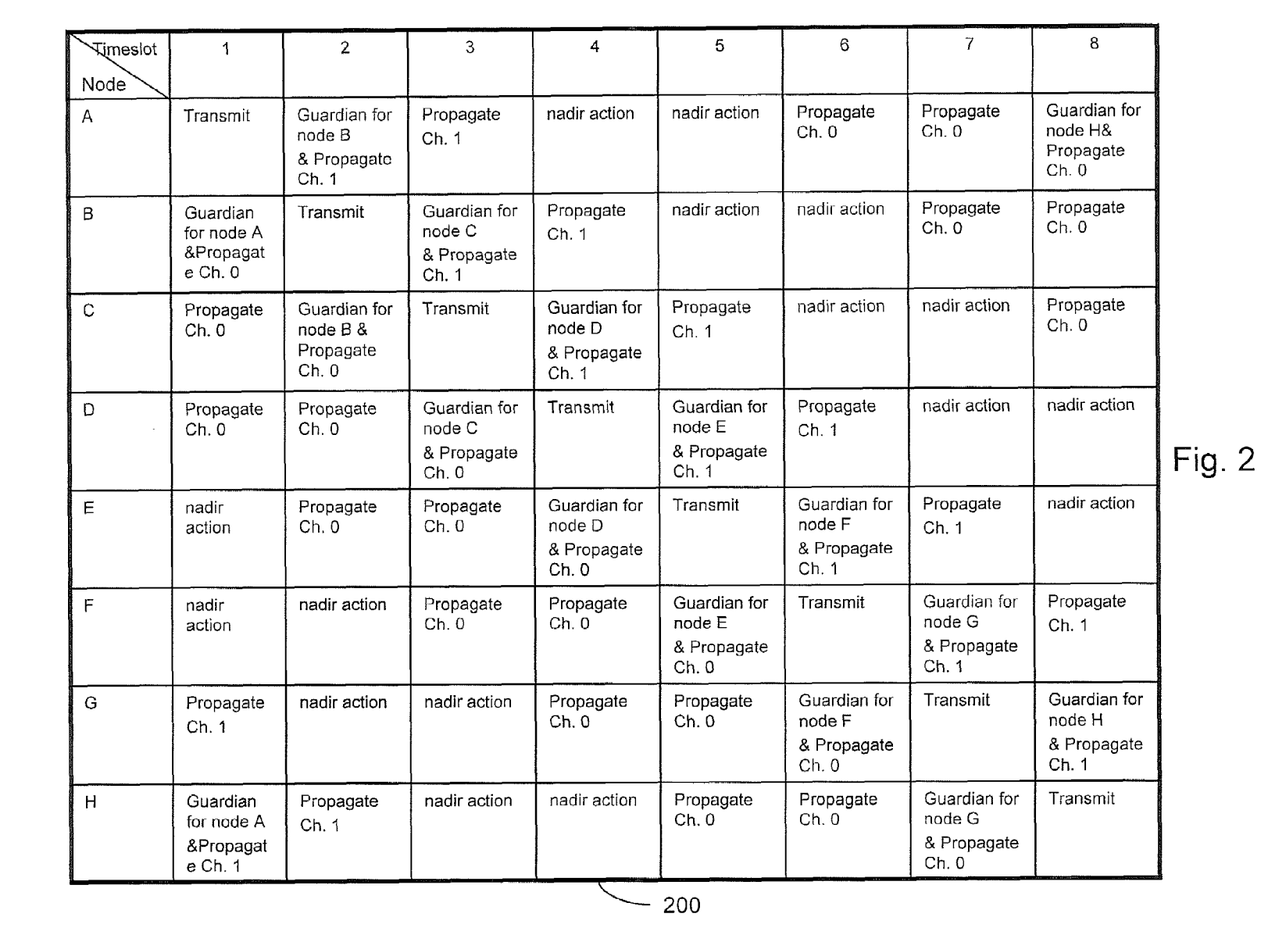
FIG. 2 is a table illustrating one embodiment of a network communication schedule.

Further, the propagation direction for each non-transmitting, non-nadir node is also determined by the network communication schedule 200. That is, for such nodes, the schedules identifies on which channel those nodes should listen for and forward data. This channel is also referred to here as the "current" channel for that non-transmitting, non-nadir node for that timeslot. For example, during timeslot 1, nodes B, C, and D relay data in the clockwise direction on channel 0, while nodes G and H relay data in the counterclockwise direction on channel 1. One skilled in the art upon reading this specification would appreciate that network communication schedule 200 shown in FIG. 2 is simplified for illustrative purposes. In other embodiments, the given schedule period may include a greater or fewer number timeslots and the pattern of behavior for nodes may be different than shown.

In the absence of the present invention, the clockwise propagation of data along channel 0 and the counter-clockwise propagation data along channel 1 would eventually meet at a point on network 100 opposite from the transmitting node 102 (hereinafter referred to as the "nadir point") and collide as two nodes 102 on either side of the nadir point simultaneously attempt to send data from opposite directions across a unidirectional direct link 108 and/or a unidirectional skip link 109. During normal operation of network 100 (that is, in the absence of a fault), embodiments of the present invention designate one or more specific nodes for each timeslot to terminate the continued propagation of data to additional downstream nodes along a channel. These nodes are referred to in this specification as the "nadir nodes". "Nadir action" (that is, data propagation termination) is configured on a link by link basis. Based on the network communication schedule 200, some links propagate data while others do not, in a manner that resolves collisions. The idea of the nadir node is that by default they resolve the data path contention hence they are then able to sense both traffic flows in order to monitor message transmissions from both sides (discussed in greater detail below).

For example, in one implementation of network 100 using network communication schedule 200, during time slot 1 when node A is scheduled as the transmitting node, nodes E and F are designated as its associated nadir nodes to perform a respective nadir action. During this time slot, node E, acting as a nadir node for node A, expects to receive clockwise propagating data originating from node A on channel 0 and counter-clockwise propagating data originating from node A on channel 1. Node E, acting as a node A nadir node, performs a nadir action by terminating continuing the propagation of channel 0 data messages to nodes F, G and H. Similarly, node F expects to receive clockwise propagating data originating from node A on channel 0 and counter-clockwise propagating data originating from node A on channel 1. Node F, acting as a node A nadir node performs a nadir action by terminating continuing the propagation of channel 1 data to nodes E, D, C and B. In one embodiment, two nadir nodes are used to prevent the continued propagation of data on both direct links 108 and skip links 109 of network 100. For example, in the counter-clockwise direction, when node E refrains from propagating channel 1 data it receives to node D via direct link 108, node D will still receive channel 1 data via skip link 109 from node F. For that reason node F is also configured as a nadir node associated with node A, which stops the propagation of the channel 1 data via the skip link 109 from node F. Whether a node 102 in network 100 performs a nadir action during any specific timeslot is determined by the network schedule.

Although the example provided by FIG. 2 illustrates the association of nodes E and F as performing nadir actions for node A, any node in network 100 can be scheduled to operate as a nadir node. Scheduling nadir action to occur at links on the ring directly opposite of the sending node has efficiency advantages as both the clockwise and counter-clockwise propagating data will arrive at that point on the ring at nearly the same point in time. However, other combinations of sending nodes and nadir nodes than shown in FIG. 2 may be used in other embodiments. For example, in another embodiment, nodes D and E can be scheduled to operate as nadir nodes during timeslots where node C is scheduled so send data. Also, although FIG. 2 illustrates nodes simply scheduled to perform a "nadir action" for a particular timeslot, two nodes schedule to operate as nadir nodes do not necessarily behave identically. As described in the example above, during time slot 1 node A is scheduled as the transmitting node and nodes E and F are designated to perform nadir actions. In one embodiment, Node E performs a nadir action as it refrains from propagating data on all links while node F performs a nadir action by terminating propagation of data sent to its skip link.

Figure 3:
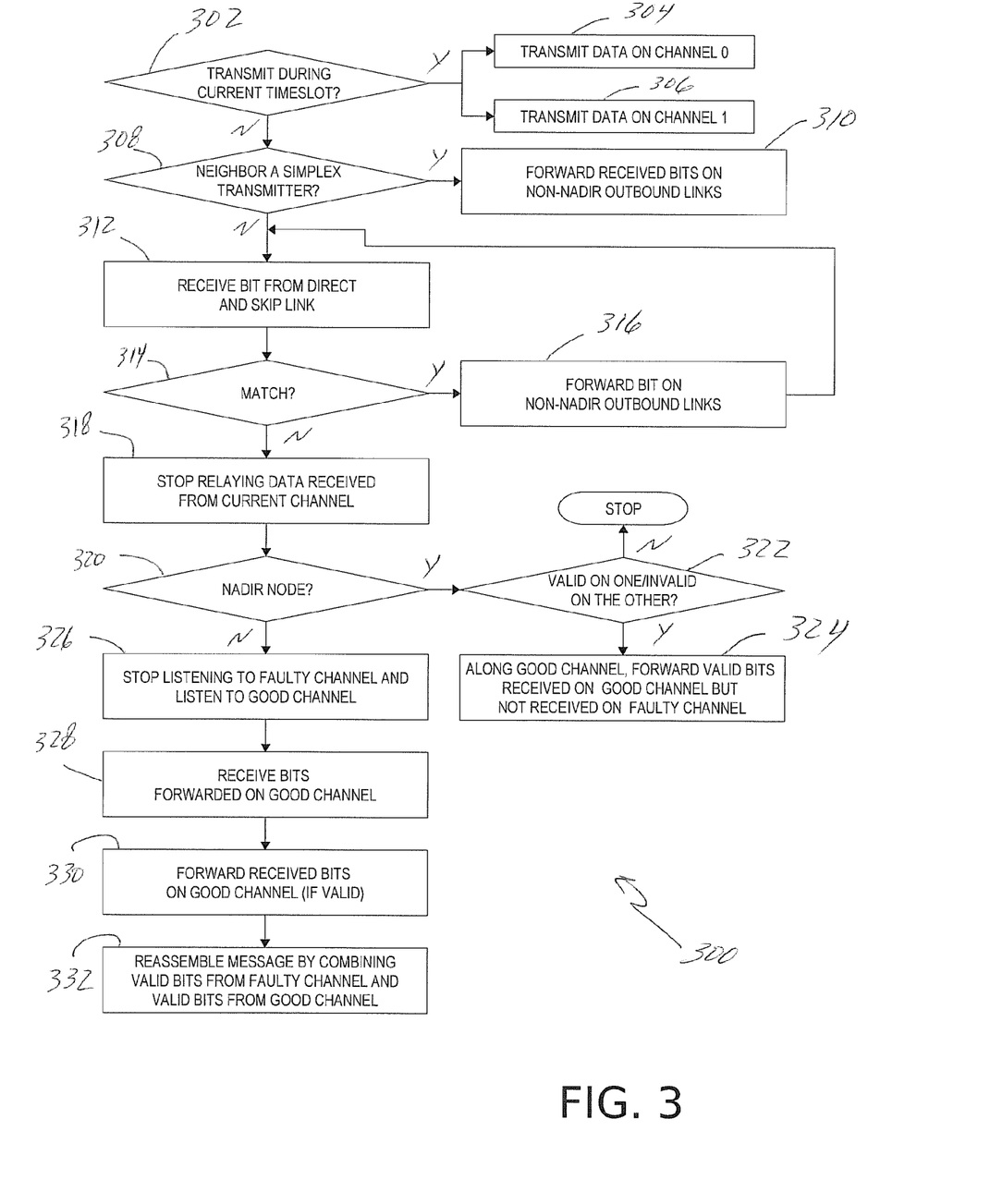
FIG. 3 is a flow chart of one embodiment of a method of communicating data in a half-duplex network.

FIG. 3 is a flow chart of one embodiment of a method 300 of communicating data in a half-duplex network. The embodiment of method 300 shown in FIG. 3 is described here as being implemented in the network 100 of FIG. 1 (though it is to be understood that other embodiments are implemented in other ways). Method 300 illustrates the processing that each node 102 in the network 100 performs during a particular period of time (that is, a timeslot of a particular TDMA round). When a node 102 is scheduled to be a transmitting node for the current timeslot (checked in block 302), that node 102 simultaneously transmits data on channel 0 to the node's clockwise neighbor (via the node's clockwise direct link 108) and to the node's clockwise neighbor's neighbor (via the node's clockwise skip link 109) (block 304) and on channel 1 to the node's counter-clockwise neighbor (via the node's counter-clockwise direct link 108) and that node's neighbor's neighbor (via the node's counter-clockwise skip link 109) (block 306). In this embodiment, for a particular timeslot, a single node may be scheduled to transit during the timeslot (which is referred to here as a "simplex transmitting node") or one self-checking pair (comprising a pair of nodes) may be scheduled to transmit during the timeslot.

When a node 102 is not scheduled to be a transmitting node for the current timeslot, the node 102 performs the processing illustrated in FIG. 3 for each channel that the node is scheduled to "listen on" for the current timeslot. As noted above, for any given timeslot, some of the non-transmitting nodes are scheduled to listen for (and possibly relay) data on channel 0 and some of the non-transmitting nodes are scheduled to listen for (and possibly relay) data on channel 1. Also, for any given timeslot, at least one of the non-transmitting nodes is scheduled to perform a nadir action for at least one of that node's links. That is, such a node is scheduled to not relay any data along at least one of that node's links. As used in the context of FIG. 3, the links for which a node is scheduled to perform a nadir action for the current timeslot are referred to here as "nadir" links of that node and the links for which a node is not scheduled to perform a nadir action for the current timeslot are referred to here as the "non-nadir" links of that node.

For each channel (referred to here as the "current" channel) that a non-transmitting node is scheduled to listen to for the current timeslot, the node 102 determines if its inbound neighbor for that channel is scheduled to be a simplex transmitting node for that timeslot (block 308). If that is the case, for the current timeslot, the node 102 forwards the data it receives on its inbound direct link 108 on that node's non-nadir outbound links (if any) for the current channel (block 310).

If the node's inbound neighbor is a transmitting node that is a part of a self-checking pair or if the node's inbound neighbor is not a transmitting node, the node waits to receive a bit of data on its inbound direct link 108 for the current channel and a corresponding bit of data on its inbound skip link 109 for the current channel (block 312). When this occurs, the node compares the bit received on the inbound direct link 108 with the corresponding bit received on the inbound skip link 108 (block 314). If the bits match, the node considers that bit to be valid and forwards the received, matching bit on that node's non-nadir outbound links (if any) for the current channel (block 316). For example, if the node is scheduled to have no nadir links for the current timeslot, the node forwards the bit onto the outbound direct link 108 and the outbound skip link 109 for the current channel. If the schedule indicates that, for the current timeslot, the outbound skip link 109 for the current channel is a nadir link but the outbound direct link 108 for the current channel is a non-nadir link, the node forwards the bit on the outbound direct link 108 but not the outbound skip link 109. If the schedule indicates that, for the current timeslot, both the outbound direct link 108 and the outbound skip link 109 for the current channel are nadir links, the node 102 does not relay the bit any further along the current channel. The node then loops back to block 312 to process the next bits.

If the most recently received bits do not match or if the node fails to receive a bit on the inbound direct link 108 or the inbound skip link 109 for the current channel within a predefined period of time, the node immediately "truncates" the message by not relaying any more bits received on the current channel for the remainder of the current timeslot (block 318). Then, the node, if it is not a nadir node, starts listening to the other channel and performs the "backfill" processing described below in connection with blocks 320-332 in order to attempt to reassemble a complete message by combining any valid bits received on the current channel with any valid bits received on the other channel.

The backfill processing shown in blocks 320-332 is performed when a non-transmitting node determines that an error has occurred in the propagation of data along the network 100. In this embodiment, at least one of the non-transmitting nodes is scheduled to not relay any data along either channel 0 or 1 if there is not an error in the network 100. That is, such a node is scheduled to take a nadir action for each of its four links. Such as a node is also referred to here as a "nadir" node. As a result, such a nadir node will be able to receive data from both channels on all four inbound links. The particular node that is performing the processing shown in blocks 320-332 determines if that node is a nadir node for the current timeslot (checked in block 320). If that is the case, when an error occurs, if that nadir node is receiving valid data from one of the channels (referred to here as the "good" channel) and invalid data on the other (referred to here as the "faulty" channel) (checked in block 322), the nadir node forwards along the good channel those valid bits it has received from the good channel but did not successfully receive from the faulty channel (block 324). Each nadir node keeps track of the valid bits it has received on both channels during each timeslot so that it may determine which bits need to forwarded as described in connection with blocks 322-324 and in order to assemble a complete, valid message for the current timeslot.

If the node is not a nadir node for the current timeslot, the node stops listening to the faulty channel and starts listening to the other good channel (block 326). The node receives any bits forwarded by a nadir node (as described above) from the good channel (block 328) and relays the bits further along the good channel if valid (determined, for example, using similar processing as is described above in connection with blocks 312-318) (block 330). The node attempts to reassemble a complete message by combining any valid bits received on the faulty channel with any valid bits received on the good channel after that node started listening to the good channel (block 332). Each such node keeps track of the valid bits it has received on both channels during each timeslot so that it may assemble a complete, valid message for the current timeslot. The node utilizes in-line integrity checks to verify that it has reconstructed the originally transmitted message correctly. In-line integrity checks can include, but are not limited to, verifying length fields and cyclic redundancy checks (CRCs).

One alternate embodiment further utilizes brother's keeper guardianship. The receiving node is scheduled to act as a guardian for its nearest neighbor when the nearest neighbor is the transmitting node. The guardian action verifies that data transmitted by a transmitting node complies with one or more policies. In one example, the guardian action verifies the integrity of a data message transmitted by the transmitting node by confirming that potential message protocol contents is correct in addition to temporal enforcement of sending times. When operating as a guardian, a node only forwards data messages it receives via the direct link from the scheduled sending node. As illustrated in FIG. 2, the network communication schedule enables a node to determine when it is permitted to transmit, when it will operate as nadir nodes, and when it will operate as brother's keeper guardian for a transmitting node.

Although the embodiments described in the specification above discuss braided-ring networks that do not operate using non-store-and-forward techniques, other embodiment that store-and-forward techniques are contemplated as within the scope of the present invention. For example, instead doing the comparison and relaying described above in connection with FIG. 3 on a bit-by-bit basis, such comparison and relaying may be done on multiple bit units of data (for example, entire messages or sub-parts thereof).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A network comprising:
 a plurality of nodes that are communicatively coupled to one another using bi-directional, half-duplex links, wherein the network has a logical first channel over which data is propagated along the network in a first direction and a logical second channel over which data is propagated along the network in a second direction;
 wherein for a given period of time, at least one of the plurality of nodes is scheduled to be a transmitting node that transmits data on both the first channel and the second channel;
 wherein a first subset of the nodes not scheduled to transmit during the period are scheduled to relay data received from the first channel along the first channel;

wherein a second subset of the nodes not scheduled to transmit during the period are scheduled to relay data received from the second channel along the second channel;

wherein at least one of the nodes not scheduled to transmit during the period is a nadir node that does not relay any data along the first channel and the second channel if data was validly received at the at least one nadir node from both the first channel and the second channel; and wherein the at least one nadir node relays data received from the first channel along the first channel if data was not validly received at the at least one nadir node from the second channel and the at least one nadir node relays data received from the second channel along the second channel if data was not validly received at the at least one nadir node from the first channel.

2. The network of claim 1, wherein if any of the data transmitted by the transmitting node during the period is not validly received from the first channel by any of the first subset of nodes, the data that was not validly received from the first channel by any of the first subset of nodes is forwarded to those nodes along the second channel for receipt thereby, and wherein those nodes in the first subset of nodes that did not validly receive from the first channel all the data transmitted by the transmitting node during the period combine data that was validly received from the first channel with data that was validly received from the second channel in order to reassemble all the data transmitted by the transmitting node during the period.

3. The network of claim 2, wherein those nodes in the first subset that combine data validly received from the first channel with data validly received from the second channel in order to reassemble all the data transmitted by the transmitting node during the period verify that the combined data was properly combined.

4. The network of claim 2, wherein:
if the at least one nadir node does not validly receive from the first channel all of the data transmitted by the transmitting node during the period and the at least one nadir node validly received from the second channel the data that was not validly received from the first channel, the at least one nadir node forwards that data along the second channel.

5. The network of claim 4, wherein:
if any of the data transmitted by the transmitting node during the period is not validly received from the second channel by any of the second subset of nodes, the data transmitted by the transmitting node during the period that was not validly received from the second channel by any of the second subset of nodes is forwarded to those nodes along the first channel for receipt thereby; and if the at least one nadir node did not validly receive from the second channel all of the data transmitted by the transmitting node during the period and the at least one nadir node validly received from the first channel the data that the at least one nadir node did not validly receive from the second channel, the at least one nadir node forwards that data along the first channel.

6. The network of claim 1, wherein:
the plurality of nodes are arranged in a braided ring in which each of the plurality of nodes is communicatively coupled in the first direction to a first neighbor node over a first bi-directional direct link and to a first neighbor's neighbor node over a first bi-directional skip link and is communicatively coupled in the second direction to a second neighbor node over a second bi-directional direct link and to a second neighbor's neighbor node over a second bi-directional skip link;

at least one of the first subset of nodes, during the period, checks each bit of data received from the first channel on the second bi-directional direct link with a corresponding bit received from the first channel on the second bi-directional skip link and if the bit of data received from the first channel on the second bi-directional direct link does not match the corresponding bit received from the first channel on the second bi-directional skip link, the respective node stops relaying data received from the first channel along the first channel for the period; and at least one of the second subset of nodes, during the period, checks each bit of data received from the second channel on the first bi-directional direct link with a corresponding bit received from the second channel on the first bi-directional skip link and if the bit of data received from the second channel on the first bi-directional direct link does not match the corresponding bit received from the second channel on the first bi-directional skip link, the respective node stops relaying data received from the second channel along the second channel for the period.

7. The network of claim 6, wherein at least one of the nodes not scheduled to transmit during the period is scheduled to act as a guardian for the period and verify that data transmitted by the transmitting node complies with at least one policy.

8. The network of claim 6, wherein at least two nodes are scheduled to transmit during the period, wherein the two nodes scheduled to act as a self-checking pair for the period such that both of the two nodes transmit the same data during the period.

9. A method of propagating data in a network comprising a plurality of nodes that are communicatively coupled to one another using bi-directional, half-duplex links, wherein the network has a logical first channel over which data is propagated along the network in a first direction and a logical second channel over which data is propagated along the network in a second direction, the method comprising, for a given period of time:

transmitting data on the first channel and on the second channel from at least one of the plurality of nodes that is scheduled to be a transmitting node;

relaying along the first channel data validly received from the first channel by a first subset of the nodes that are not scheduled to transmit during the period;

relaying along the second channel data validly received from the second channel by a second subset of the nodes that are not scheduled to transmit during the period;

stopping relay of data along the first channel and the second channel at least one node scheduled to be a nadir node if data was validly received at the at least one nadir node from both the first channel and the second channel relaying data received at the at least one nadir node from the first channel along the first channel if data was not validly received at the at least one nadir node from the second channel; and relaying data received at the at least one nadir node from the second channel along the second channel if data was not validly received at the at least one nadir node from the first channel.

10. The method of claim 9, further comprising, if any of the data transmitted by the transmitting node during the period is not validly received from the first channel by any of the first subset of nodes:

forwarding along the second channel the data transmitted by the transmitting node during the period that was not validly received from first channel by any of the first subset of nodes for receipt thereby; and at those nodes in the first subset of nodes that did not validly receive from the first channel all the data transmitted by the transmitting node during the period, in order to reassemble all the data transmitted by the transmitting node during the period, combining data that was validly received at those nodes from the first channel with data that was validly received at those nodes from the second channel.

11. The method of claim 10, wherein:

if the at least one nadir node does not validly receive from the first channel all of the data transmitted by the transmitting node during the period and the at least one nadir node validly received from the second channel the data that the at least one nadir node did not validly receive from the first channel, forwarding that data along the second channel from the at least one nadir node.

12. The method of claim 11, wherein:

if any of the data transmitted by the transmitting node during the period is not validly received from the second channel by any of the second subset of nodes, the data transmitted by the transmitting node during the period that was not validly received from the second channel by any of the second subset of nodes is forwarded to those nodes along the first channel for receipt thereby; and if the at least one nadir node did not validly receive from the second channel all of the data transmitted by the transmitting node during the period and the at least one nadir node validly received from the first channel the data that the at least one nadir node did not validly receive from the second channel, forwarding that data along the first channel from the at least one nadir node.

13. The method of claim 11, wherein:

the plurality of nodes are arranged in a braided ring in which each of the plurality of nodes is communicatively coupled in the first direction to a first neighbor node over a first bi-directional direct link and to a first neighbor's neighbor node over a first bi-directional skip link and is communicatively coupled in the second direction to a second neighbor node over a second bi-directional direct link and to a second neighbor's neighbor node over a second bi-directional skip link;

relaying along the first channel data validly received from the first channel by the first subset of the nodes comprises, for at least one of the first subset of nodes, forwarding data validly received at that node on the second bi-directional direct link and the second bi-directional skip link on to at least one of the first bi-directional direct link and the first bi-directional skip link for that node;

relaying along the second channel data validly received from the second channel by the second subset of the nodes comprises, for at least one of the second subset of nodes, forwarding data validly received at that node on the first bi-directional direct link and the first bi-directional skip link on to at least one of the second bi-directional direct link and the second bi-directional skip link for that node; and data is validly received from the first channel by a node if the node receives the data from the second bi-directional direct link and the second bi-directional skip link; and data is validly received from the second channel by a node if the node receives the data from the first bi-directional direct link and the first bi-directional skip link.

14. The method of claim 13, wherein each of the first subset of nodes, during the period, checks each bit of data received from the first channel on the second bi-directional direct link with a corresponding bit received from the first channel on the second bi-directional skip link and if the bit of data received from the first channel on the second bi-directional direct link does not match the corresponding bit received from the first channel on the second bi-directional skip link, the respective node stops relaying data received from the first channel along the first channel for the remainder of the period.

15. A program product comprising program instructions embodied on a processor-readable storage medium for execution by a programmable processor included in a node that is used in a network comprising a plurality of nodes that are communicatively coupled to one another using bi-directional, half-duplex links, wherein the network has a logical first channel over which data is propagated along the network in a first direction and a logical second channel over which data is propagated along the network in a second direction, wherein the program instructions are operable to cause the programmable processor to:

when the node is scheduled to be a transmitting node for a given period of time:
transmit data on the first channel and on the second channel; and while the node is scheduled to be a nadir node for the period:
relay, along the first channel, data validly received from the first channel when the node does not validly receive data from the second channel;
relay, along the second channel, data validly received from the second channel when the node does not validly receive data from the first channel; and
not relay any data along the first channel and the second channel when the node validly receives data from both the first channel and the second channel.

16. The program product of claim 15, wherein the program instructions are further operable to cause the programmable processor to:

when scheduled to be a nadir node for the period:
receive data from both the first channel and the second channel; and
if the node determines that any of a first subset of nodes did not validly receive from the first channel all of the data transmitted by the transmitting node during the period and the node received from the second channel the data that was not validly received from the first channel by any of the first subset of nodes, forward that data along the second channel.

17. The program product of claim 16, wherein the program instructions are further operable to cause the programmable processor to:

when scheduled to be a nadir node for the period:
if the node determines that any of a second subset of nodes did not validly receive from the second channel all of the data transmitted by the transmitting node during the period and the node received from the first channel the data that was not validly received from the second channel by any of the second subset of nodes, forward that data along the first channel.

18. The program product of claim 15, wherein:

the plurality of nodes are arranged in a braided ring in which each of the plurality of nodes is communicatively coupled in the first direction to a first neighbor node over a first bi-directional direct link and to a first neighbor's neighbor node over a first bi-directional skip link and is communicatively coupled in the second direction to a second neighbor node over a second bi-directional direct link and to a second neighbor's neighbor node over a second bi-directional skip link;

the program instructions are further operable to cause the programmable processor to:

when the node is scheduled to relay along the first channel data that was validly received from the first channel, the node forwards data validly received on the second bi-directional direct link and the second bi-directional skip link on at least one of the first bi-directional direct link and the first bi-directional skip link;

when the node is scheduled to relay along the second channel data that was validly received from the second channel, the node forwards data validly received on the first bi-directional direct link and the first bi-directional skip link on at least one of the second bi-directional direct link and the second bi-directional skip link;

wherein data is validly received from the first channel if the node receives the data from the second bi-directional direct link and the second bi-directional skip link; and wherein data is validly received from the second channel if the node receives the data from the first bi-directional direct link and the first bi-directional skip link.

19. The program product of claim 18, wherein the program instructions are further operable to cause the programmable processor to:

when the node is scheduled to relay along the first channel data that was validly received from the first channel, check each bit of data received from the first channel on the second bi-directional direct link with a corresponding bit received from the first channel on the second bi-directional skip link and if the bit of data received from the first channel on the second bi-directional direct link does not match the corresponding bit received from the first channel on the second bi-directional skip link, cause the node to stop relaying data received from the first channel along the first channel; and when the node is scheduled to relay along the second channel data that was validly received from the second channel, check each bit of data received from the second channel on the first bi-directional direct link with a corresponding bit received from the second channel on the first bi-directional skip link and if the bit of data received from the second channel on the first bi-directional direct link does not match the corresponding bit received from the second channel on the first bi-directional skip link, cause the node to stop relaying data received from the second channel along the second channel.

* * * * *

UNITED STATES PATENT AND TRADEMARK OFFICE
CERTIFICATE OF CORRECTION

PATENT NO. : 7,668,084 B2 Page 1 of 1
APPLICATION NO. : 11/537305
DATED : February 23, 2010
INVENTOR(S) : Driscoll et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 636 days.

Signed and Sealed this

Seventh Day of December, 2010

David J. Kappos
*Director of the United States Patent and Trademark Office*